No. 611,705. Patented Oct. 4, 1898.
A. W. OBERMANN.
CULINARY VESSEL.
(Application filed Jan. 15, 1896. Renewed Mar. 9, 1898.)

(No Model.) 2 Sheets—Sheet 1.

WITNESSES:

INVENTOR
August H. Obermann,
BY Briesen & Knauth
ATTORNEYS.

No. 611,705. Patented Oct. 4, 1898.
A. W. OBERMANN.
CULINARY VESSEL.
(Application filed Jan. 15, 1896. Renewed Mar. 9, 1898.)
(No Model.) 2 Sheets—Sheet 2.
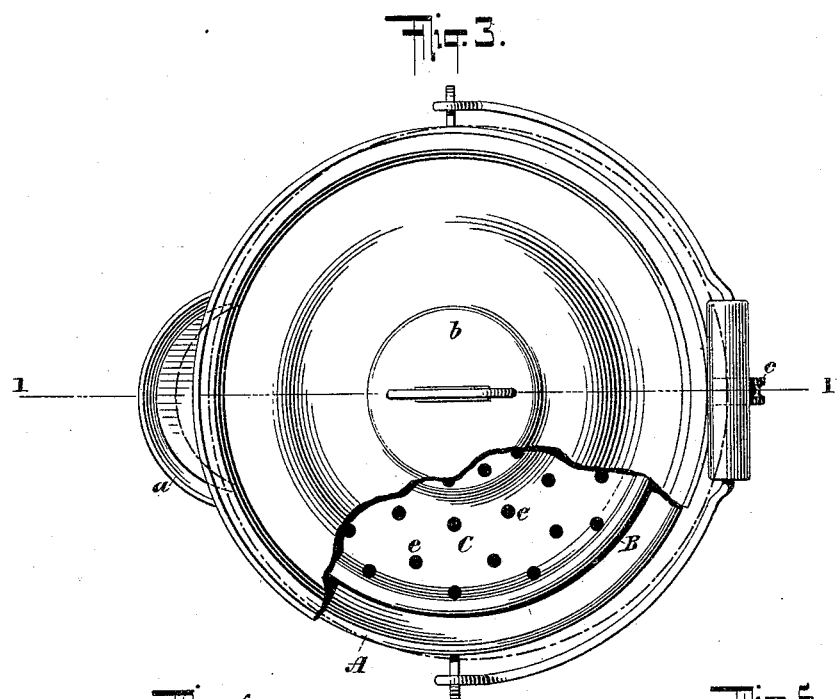
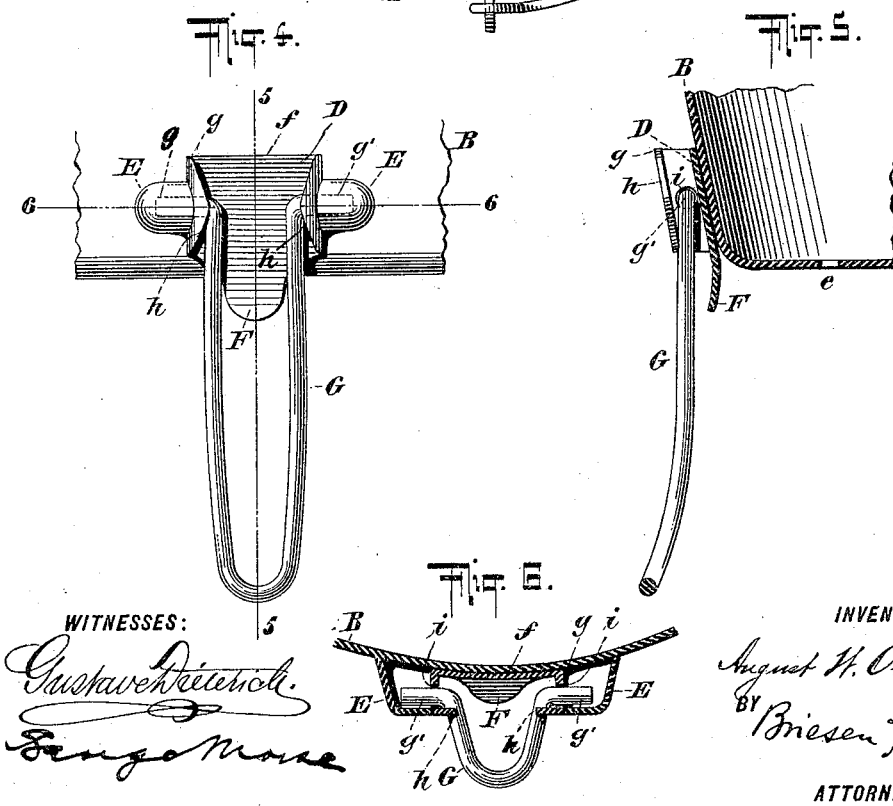
WITNESSES:
INVENTOR
August W. Obermann,
BY Briesen & Knauth
ATTORNEYS.

UNITED STATES PATENT OFFICE.

AUGUST W. OBERMANN, OF NEW YORK, N. Y.

CULINARY VESSEL.

SPECIFICATION forming part of Letters Patent No. 611,705, dated October 4, 1898.

Application filed January 15, 1896. Renewed March 9, 1898. Serial No. 673,274. (No model.)

*To all whom it may concern:*

Be it known that I, AUGUST W. OBERMANN, a resident of the city, county, and State of New York, have invented certain new and useful Improvements in Culinary Vessels, of which the following is a specification.

My invention relates to that class of culinary vessels with which boiling and steaming operations may be performed, such as the vessel for which I have heretofore obtained Letters Patent No. 528,382, dated October 30, 1894.

The special features of my invention will be hereinafter pointed out and claimed.

My invention will be understood by reference to the accompanying drawings, which in various views illustrates a culinary vessel embodying my invention, like letters of reference indicating like parts in the several views.

Figure 1:
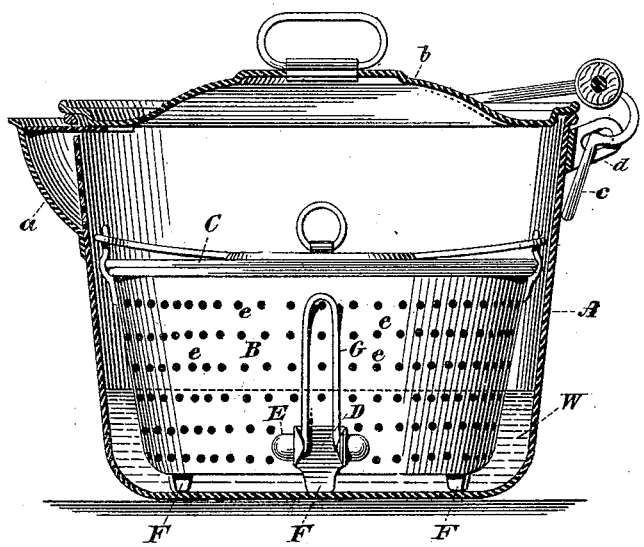
Figure 2:
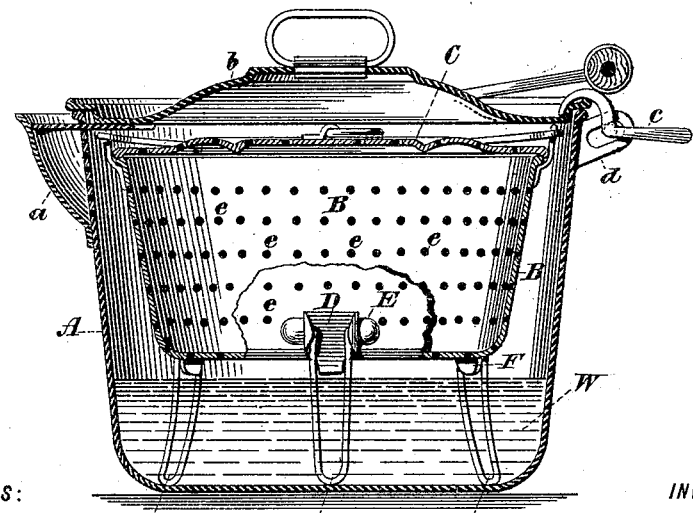

In the drawings, Figure 1 is a sectional elevation of the vessel as used for boiling substances. Fig. 2 is a similar sectional view showing the vessel as used for steaming. Fig. 3 is a partial plan view of the vessel. Fig. 4 is a detached detail view of one of the pairs of legs of the vessel. Fig. 5 is a section thereof on line 5 5 of Fig. 4; and Fig. 6 is another section thereof, taken on line 6 6 of Fig. 4.

I have shown in the drawings an outer or containing vessel A, which may be provided with a lip $a$ and which is surmounted by a cover $b$, which rests upon the upper edge of the vessel A and is capable of a lateral movement thereon, as clearly indicated in dotted lines in Fig. 3, in order to permit steam to escape by way of the passage formed by the lip $a$, this lateral motion being preferably accomplished through the medium of a lever $c$, pivoted in a slotted ear $d$. Contained within the vessel A is a colander-like vessel B, which is perforated, colander fashion, by perforations $e$ and is capped by a perforated cover C. (Shown clearly in Figs. 2 and 3.) On the sides of the vessel B, which I have illustrated, I have shown a cammed leg D, shown as consisting of a plate $f$, bent up at its edges $g$, which are formed into cam-surfaces $h$ for the long legs G to work upon. The edges $g$ are perforated, as at $i$, for the reception of the long legs G, sockets E being provided in rear of the perforations to assist in subserving the purpose. These sockets are carried from the body of the vessel B. The leg portion proper extends below the bottom of the vessel B, which extensions are designated by the letter F. The legs G, which I will hereinafter term "long" legs, for the reason that they are of greater length than the short legs, are in the present instance constructed of pieces of wire looped upon themselves into the form shown and having the free ends $g'$ bent outwardly at an angle, so that they will enter the apertures $i$ and sockets E. The springy character of the wire has the effect of pressing the bent ends $g'$ with considerable force into the apertures and sockets, so that the sides or sections of the legs will bear springily against the cam-faces $h$.

The operation of my device is as follows: When it is desired to boil articles, they are inclosed in the apertured vessel B and the apertured cover is placed thereon, the whole being placed in the exterior vessel, as shown in Fig. 1, the vessel B resting in the body of water W, which enters the vessel B through the apertures or perforations $e$ and has free circulation through and around the vessel B, the cover $b$ of the vessel A being placed thereon to confine the steam evolved from the water.

It will be obvious that the apparatus as shown in Fig. 1 is arranged for successful boiling and that owing to the fact that the cover $c$ is apertured it will permit the steam to circulate freely, and there will be no tendency for it to be lifted by the steam. It is likewise obvious that the steam may be permitted to have a more or less free vent from the vessel A by displacing the cover $b$ laterally, as shown in dotted lines in Fig. 1 and sectionally in Fig. 2, the said cover being specially constructed for such operation.

When it is desired to steam substances, the articles being first inclosed in the vessel B, the long legs are brought into action by swinging them from the position shown in Fig. 1 to the position shown in the remaining figures, the legs turning readily upon their ends $g'$ $g'$ as a pivot and being maintained in either adjusted position by the springy pressure of the arms against the turned-up edges $g$ of the plate $f$, as will be readily understood. The vessel B is now inclosed in the vessel A, as shown in Fig. 2, where it will be observed that the vessel B is supported by the long legs above the level of the water in the vessel A and that the steam will have free access through and around the vessel B, so that the contents thereof may be thoroughly steamed.

My apparatus will be found especially desirable for cooking rice, which is first boiled, which may be done, as shown in Fig. 1, by immersion, and then steamed, which may be done, as shown in Fig. 2, by bringing the long legs into action.

What I claim, and desire to secure by Letters Patent, is—

1. A culinary vessel having a set of short legs projecting below the bottom thereof, and a set of swinging long legs located adjacent to and taking the place of the short legs when shifted below the bottom of the vessel, substantially as and for the purposes set forth.

2. A cooking vessel having a set of short legs and a set of shiftable long legs, the said long and short legs being commonly situated, the long legs being spring-energized and coöperating with cam-surfaces for retaining them in their shifted positions.

3. A cooking vessel having a set of short legs, having cams $h$ forming part thereof, the said cams being placed opposite to and extending toward each other, a set of shiftable long legs, each of which is carried by the short legs and coöperate with the cams thereof to be thereby retained in their shifted positions, substantially as described and shown, and for the purposes set forth.

AUGUST W. OBERMANN.

Witnesses:
GEORGE MORSE,
MAURICE BLOCK.